United States Patent
Armbruster et al.

(10) Patent No.: US 7,483,778 B2
(45) Date of Patent: Jan. 27, 2009

(54) REDUNDANT ARRAY OF CONTROL DEVICES

(75) Inventors: Michael Armbruster, Koenigstein-Stein (DE); Harro Heilmann, Stuttgart (DE); Ansgar Maisch, Ettlingen (DE); Oliver Rooks, Karlsruhe (DE); Andreas Schwarzhaupt, Oberrot (DE); Gernot Spiegelberg, Heimsheim (DE); Armin Sulzmann, Oftersheim (DE)

(73) Assignee: Daimler AG, Stuttgart (DE)

( * ) Notice: Subject to any disclaimer, the term of this patent is extended or adjusted under 35 U.S.C. 154(b) by 597 days.

(21) Appl. No.: 10/513,826

(22) PCT Filed: Aug. 30, 2003

(86) PCT No.: PCT/EP03/09642

§ 371 (c)(1),
(2), (4) Date: Jul. 21, 2005

(87) PCT Pub. No.: WO2004/029737

PCT Pub. Date: Apr. 8, 2004

(65) Prior Publication Data

US 2006/0116803 A1    Jun. 1, 2006

(30) Foreign Application Priority Data

Sep. 20, 2002   (DE)   ................................ 102 43 713

(51) Int. Cl.
*G05B 9/03* (2006.01)
*G06F 17/00* (2006.01)

(52) U.S. Cl. .............................. 701/48; 701/29; 701/33; 713/330

(58) Field of Classification Search ...................... 701/1, 701/29, 33, 36, 48; 713/330
See application file for complete search history.

(56) References Cited

U.S. PATENT DOCUMENTS 4,621,327 A * 11/1986 Dolph et al. .................. 701/43

(Continued)

FOREIGN PATENT DOCUMENTS

DE           44 39 060 A1      5/1996

(Continued)

OTHER PUBLICATIONS

German Office Action dated Nov. 25, 2005 (eight (8) pages).

(Continued)

*Primary Examiner*—Tan Q. Nguyen
(74) *Attorney, Agent, or Firm*—Crowell & Moring LLP

(57) ABSTRACT

An array of control devices having a plurality of control devices (1-3, 20-23) which are interconnected via a first data bus (4), in a means of transportation, control devices (1-3; 20-23) which are of redundant configuration with respect to a control function being provided, and in each case a data bus isolating switch (5) being assigned to the control devices (1-3; 20-23) which are of redundant configuration, the data bus isolating switch(s) connecting or disconnecting the data bus (4) as a function of an evaluation signal. In order to optimize the redundant array, each of these data bus isolating switches (5) is connected to a signal line of at least one further redundant control device (1-3; 20-23), a further redundant control device (2, 3; 21; 23) transmits an evaluation signal to the data bus isolating switch (5) which is assigned to a first redundant control device (1; 20; 22).

21 Claims, 2 Drawing Sheets

U.S. PATENT DOCUMENTS

| | | | | |
|---|---|---|---|---|
| 4,622,667 | A | * | 11/1986 | Yount ........................ 714/11 |
| 4,945,486 | A | * | 7/1990 | Nitschke et al. ............ 701/114 |
| 5,515,282 | A | | 5/1996 | Jackson |
| 5,526,264 | A | * | 6/1996 | Niggemann et al. .......... 701/76 |
| 5,895,434 | A | | 4/1999 | Fennel et al. |
| 6,732,285 | B1 | | 5/2004 | Sommer et al. |

FOREIGN PATENT DOCUMENTS

| | | |
|---|---|---|
| DE | 196 12 423 | 10/1997 |
| DE | 196 31 309 | 2/1998 |
| DE | 199 15 253 | 10/2000 |
| DE | 100 02 519 | 4/2001 |
| DE | 199 47 251 A1 | 5/2001 |
| DE | 199 44 939 C1 | 8/2001 |
| EP | 0 573 106 | 12/1993 |
| EP | 0 760 973 | 3/1997 |
| JP | 6-348524 A | 12/1994 |
| JP | 10-508554 A | 8/1998 |
| JP | 2001-109502 A | 4/2001 |
| WO | WO 93/25945 | 12/1993 |
| WO | WO 02/055356 | 7/2002 |

OTHER PUBLICATIONS

English translation of corresponding Japanese Office Action dated Aug. 25, 2006 (Four (4) pages).
International Search Report.

* cited by examiner

REDUNDANT ARRAY OF CONTROL DEVICES

This application claims priority to International Patent Application No. PCT/EP03/09642, filed Aug. 30, 2003, designating the United States of America, and German Application DE 102 43 713.0 filed on Sep. 20, 2002, the entire disclosure of which is incorporated herein by reference.

BACKGROUND AND SUMMARY OF THE INVENTION

The invention relates to an array of control devices having a plurality of control devices which are interconnected via a first data bus, and a data bus isolating switch.

Safety-related systems in drive-by-wire vehicles—drive-by-wire meaning that each drive train function of a vehicle, including the steering, is controlled exclusively by means of electrical signals—have to be particularly protected against failure. Examples of drive-by-wire systems in vehicles are steer-by-wire systems in which there is no permanent mechanical or hydraulic connection between the steering wheel and the steerable vehicle wheels, or ESP (Electronic Stability Program) systems in which the driving behavior of the vehicle is adapted in the limiting range of vehicle movement dynamics. In order to increase the failsafeness of such drive-by-wire systems, these systems are of redundant configuration so that when, for example, one control device fails, it is possible to switch over to a control device which is of redundant configuration.

A system which is of redundant configuration is a system in which a component, for example a microprocessor, is provided multiply and the same function is carried out on these components which are provided multiply. This means in particular that the same input data is processed by the components and the same output data is produced it being possible to assign the output data to the components for evaluation purposes.

Known redundant arrays are the TRM (Triple Modular Redundancy) system and the duo-duplex system.

In the TRM system, also referred to as the two out of three system, three redundant components are coupled in such a way that a faulty component can be detected and it is prevented from having any effect on the surroundings.

In the case of the duo-duplex system, also referred to as the dual self-checking pair system, in each case two redundant components are combined to form one channel, it being possible to detect the faulty behavior of a component within a channel. If the faulty behavior of a component is detected, the corresponding channel is switched off.

European Patent document EP 0 760 973 B1 discloses a processing system in an aircraft wire remote-steering control system, in which each of a plurality of redundant, asynchronous primary flight computers generates command signals, at least one control surface of the aircraft being controlled by a plurality of actuator drives. The processing system controls the flight command signals which are transmitted to the actuator drives, and contains a plurality of selectors, each selector being connected to a primary flight computer and one or more actuator drives in order to receive the flight command signals from all the primary flight computers, and voting means for acting in accordance with a predetermined selection algorithm in order to transmit a selected flight signal.

German Patent document DE 196 31 309 A1 discloses a microprocessor array for a vehicle regulating system which has a plurality of microprocessor systems which are of redundant configuration and are connected to one another by means of bus systems. The data processing in the microprocessors is used for regulating systems such as antilock brake control and/or traction control as well as for conditioning input signals. The output results an/or intermediate results of the data processing which, are symmetrically redundant, are compared. When they differ, the respective system is switched off. In addition, the data processing operations which run in these microprocessor systems are each compared with the results of a simplified data processing operation and checked for plausibility. In the case of discrepancies, the regulating system can be maintained temporarily for functionally important data which is not "safety-critical".

Redundant system functions of transportation are generally implemented by a plurality of microprocessors accommodated on a printed circuit board. This implementation of redundant systems has the advantage of short and high-speed switching paths between the microprocessors. The disadvantage is that this implementation is the very high development costs and long development times. This is disadvantageous in particular in the field of automobiles because ever shorter development times are now being required for the generation of new models.

For this reason, systems which are of redundant configuration in the field of automobiles are composed of components which are already available on the market and only have to be adapted to a minimum degree in order to be part of a redundant system. In particular, control devices which are already available on the market are suitable as components.

The object of the present invention is to optimize a redundant array of control devices in such a way that control devices only have to be adapted to a minimum degree as part of a redundant system.

This object is achieved according to the invention by having each data bus isolating switch connected to a signal line of at least one further redundant control device. A further redundant control device transmits an evaluation signal to the data bus isolating switch which is assigned to a first redundant control device. The evaluation signal is a result of functional checking of the further redundant control device with respect to the first redundant control device. The data bus isolating switch of the first redundant control device disconnects the data bus as a function of the result of a logic circuit. At least one input signal of the logic circuit is formed by the at least one evaluation signal.

The array of control devices according to the invention has the advantage that control devices of any desired manufacturers can be used to make up a redundant array.

It is further advantage that the switching off of the control devices and the isolation from the data bus is independent of the voting process which is used in the redundant control. The voting process in the redundant control device for evaluating the further redundant control devices is independent of the selected hardware or software and can be changed individually. Only the final evaluation signal, which has to be transmitted to the data bus isolating switch of the respective evaluated redundant control device, is important.

The data bus isolating switch can be developed independently of the control device since the switch does not require any functional elements of the control device nor does the control device require any functional elements of the data bus isolating switch.

The simple design of the array of control devices and the data bus isolating switch is advantageous, ensuring high-speed and cost-effective manufacture.

Since all the output assignments of the data bus isolating switch can easily be completely tested by means of all the input assignments, the data bus switch can be manufactured with a high degree of reliability.

Since the array of control devices is based on a smallest units of two control devices which are redundant with respect to a control function, the array of control devices can be expanded with further control devices which are redundant with respect to this control function. As a result, it is possible to easily map TRM and duo-duplex arrays.

The array of control devices, which has a first and second data bus, has the advantage that when a data bus is disconnected, the disconnection can be bridged by means of a gateway circuit. This can be a rapid remedy, for example, in the event of a short-circuit of the data bus or a disconnection of the data bus cable.

A further advantage of the array of control devices with the additional data bus is that the first data bus, by which the communication is carried out with the further control devices of the means of transportation, is not loaded with additional data traffic.

There are then various possible ways of advantageously configuring and developing the teaching of the present invention.

BRIEF DESCRIPTION OF THE DRAWINGS

The drawing illustrates an embodiment of the array of control devices according to the invention and of the data bus isolating switch according to the invention. In said drawing, in each case in a schematic view.

DETAILED DESCRIPTION OF THE DRAWINGS

Figure 1:
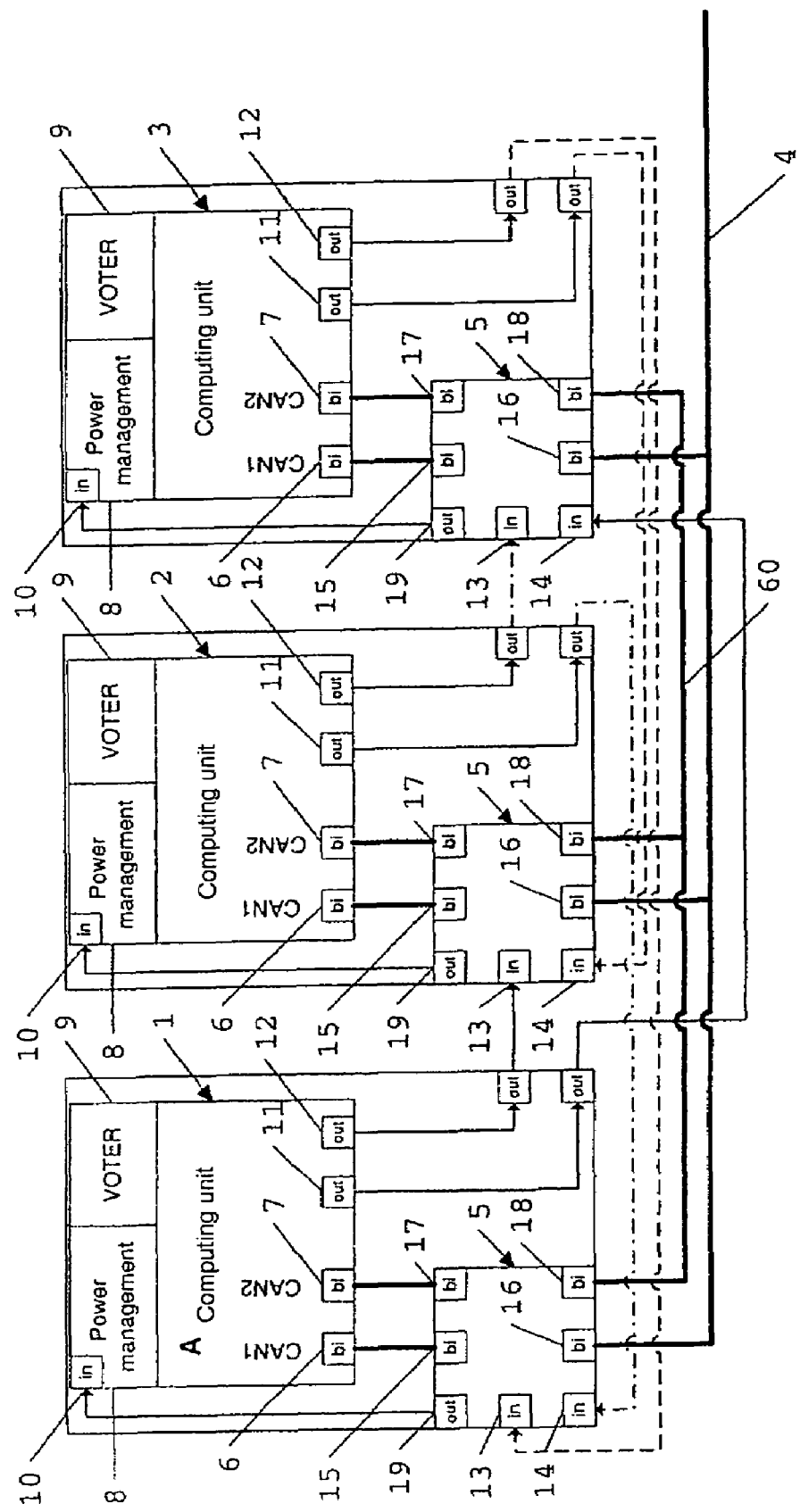
FIG. 1 is a block circuit diagram of a first embodiment of the array of control devices according to the invention.

The array of control devices according to the invention is represented in FIG. 1. Three control devices 1, 2, 3, which are of redundant configuration with respect to the ESP (Electronic Stability Program) control function in a vehicle, are connected together in a TRM (Triple Modular Redundancy) array.

The three redundant control devices 1, 2, 3 are connected to further control devices of the vehicle via a first data bus 4. In addition, the three redundant control devices 1, 2, 3 are connected to one another via a second data bus 60. This data bus is used exclusively to exchange the result signals between the three control devices 1, 2, 3 which are of redundant configuration. The first and second data bus 4, 60 is embodied as a CAN (Controller Area Network) data bus.

As a result, each of the three control devices 1, 2, 3 which are of redundant configuration has two bidirectional data bus connections 6, 7. The data bus connection 6 is used to connect to the first data bus 4, and the data bus connection 7 is used to connect to the second data bus 60.

The redundant control devices 1, 2, 3 each have a voltage supply unit 8 and a voting means 9, in addition to the computing unit with processor and memory for carrying out the ESP control function.

The voltage supply unit 8 of the redundant control devices 1, 2, 3 has an input port 10. Via this port 10 it is possible to switch off the voltage supply of the control device, that is to say the control device itself, by means of a signal.

The method of operation of the array of control devices according to the invention in conjunction with the data bus isolating switch 5 will now be explained using the example of a control device 1. The further control devices 2, 3 operate equivalently.

The control device 1 processes input data which it receives via the first data bus 4 from further control devices, actuators, sensors etc. connected to the data bus 4. For the ESP control function, this input data is the yaw rate, the speed, the engine speed and the acceleration of the vehicle.

This input data is processed by the control part of the control device 1 and generates output data. This output data is applied to the second data bus 60 where it is sensed by the further control devices 2, 3. The control device 1 itself registers the output data of the further control devices 2, 3.

The voting means 9, also referred to as the voter, has the purpose of carrying out an evaluation from a plurality of comparison operations between its own output data and the received output data of the further control devices 2, 3. The voting means, which is implemented by means of software, is configured here in such a way that deviations between the output data items in terms of time and absolute value are permitted.

The voting process in the TRM system proceeds as follows: When there is noncorrespondence between all the three output data items, the system is switched off. When there is correspondence between two output data items, a single error is present and the corresponding output data items are accepted as correct output data. When all three data items correspond, there is no error present. Each output data item can be accepted as a variable.

After the voting process has been concluded, the voting means 9 assigns in each case an evaluation signal to the transmitted output signals of the further control devices 2, 3.

Only one marked A of the three redundant control devices 1, 2, 3, here the control device 1, is the control device which transmits its output signal, after the voting process, to the first data bus 1 in order to transmit commands to the further control devices connected to the data bus 4. If, after a voting process, it is determined that the control device 1 is operating incorrectly, one of the further control devices 2, 3 takes over the function of transmitting the output data determined after the voting process to the first data bus 4. For this purpose, a parameter which specifies which control device of the control devices 1-3 of redundant configuration takes over this function is stored in the voting means.

The control device 1 in FIG. 1 has two output ports 11, 12 which are used to transmit the evaluation signals of the output data of the further redundant control devices 2, 3. These output ports 11, 12 are connected via a respective signal line to the input ports 13, 14 of the respective data bus isolating switches 5 of the further control devices 2, 3. The evaluation signal is transmitted to the respective data bus isolating switches of the control devices 2, 3 via this signal line.

The data bus isolating switch 5 has in each case two bidirectional data bus connections 15, 16 and 17, 18, respectively, which are connected via switches. The data bus connections 15-18 are connected in such a way that they connect or disconnect the connection of the control device 1 to the first data bus 4 via the connections 15, 16, and to the second data bus 60 via the connections 17, 18.

The data bus isolating switch 5 additionally has a logic circuit whose input signals are formed by the input ports 13, 14 of the data bus isolating switch 5. The evaluation signals of the further control devices 2, 3 are transmitted to the input ports 13, 14 of the data bus isolating switch 5 via the output signals of the control device 1.

The logic circuit of the data bus isolating switch 5 is composed of an OR gate. The evaluation signals which arrive at the input ports 13, 14 either have the value zero for noncorrespondence or the value one for correspondence of the output signals. Depending on the result of the logic circuit, that is to say zero for a faulty control device 1 or one for a fault-free control device 1, the data bus isolating switch disconnects the connection between the data bus connections 15, 16 and 17, 18, respectively, in the case of a fault. In the case of a fault, the control device 1 is thus disconnected from the communication via the first and second data buses 4, 60.

In addition, the data bus isolating switch has an output port 19. This output port 19 of the control device 1 is connected to the input port 10 of the voltage supply of the control device 1 via a signal line. In the case of a fault, the data bus isolating switch 5 additionally transmits a signal via the output port 19 of the data bus isolating switch 5 to the input port 10 of the voltage supply 8, which signal switches off the voltage supply 8 of the control device 1, and thus the control device 1 itself.

Figure 2:
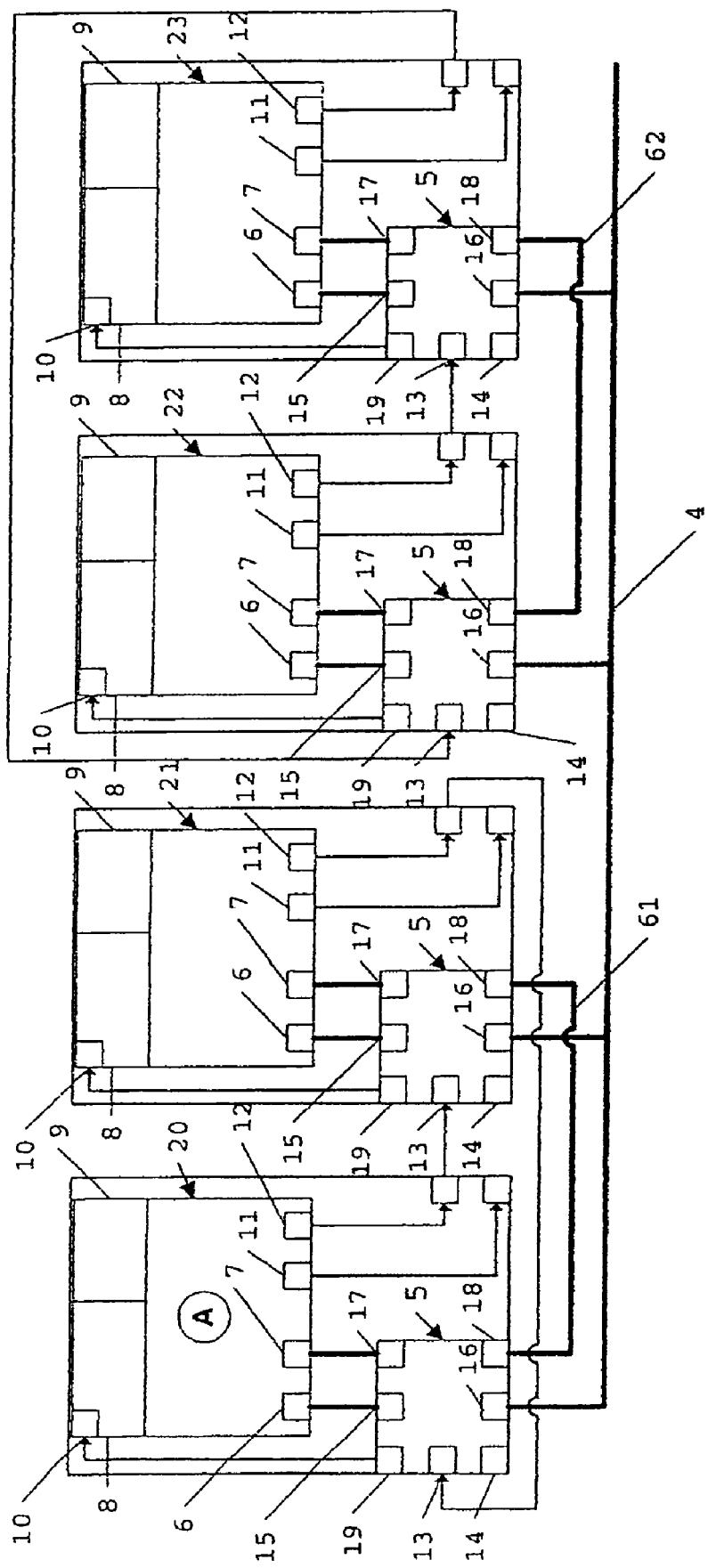
FIG. 2 is a block circuit diagram of a further embodiment of the array of control devices according to the invention.

FIG. 2 represents a further embodiment of the array of control devices according to the invention. Here, four control devices 20-23 which are of redundant configuration with respect to the ESP (Electronic Stability Program) control function in a vehicle are connected together in a duo-duplex array. The four redundant control devices 20-22 in FIG. 2 are connected to further control devices of the vehicle via a first data bus 4.

As already stated, in a duo-duplex array, in each case two redundant control devices of the four control devices which are of redundant configuration with respect to the ESP control function are combined to form a logic channel. The duo-duplex array therefore requires, in contrast to the TRM array, a second independent data bus for the respective channel.

As a result, in each case two, 20, 21 or 22, 23, of the four redundant control devices 20-23 in FIG. 2 are connected to one another via a second data bus 61 or 62, respectively. The two second data buses 61, 62 are used exclusively for exchanging the result signals between in each case two of the four control devices 20-23 which are of redundant configuration. The data buses 4, 61, 62 are embodied as CAN (Controller Area Network) data buses.

By way of example, the method of operation of the array of control devices according to the invention in the duo-duplex array will now be explained using the example of a pair 20, 21 of control devices. The further pair 22, 23 of control devices operate equivalently. Further details on methods of operation of the individual components will not be provided in so far as they have already been explained in FIG. 1.

The voting means 9 of the control device 20 in a pair of the duo-duplex array carries out comparison operations only with respect to result signals of one further control device 21. The control device 20 thus supplies only one evaluation signal which is transmitted to the data bus isolating switch by means of a signal line from the output port 12 to the input port 13 of the data bus isolating switch 5 of the control device 21.

The data bus isolating switch 5 of the control device 20 receives the evaluation signal of the control device 21 relating to the output data of the control device 20 via the input port 13. The logic circuit of the data bus isolating switch 5 has, as an input signal, the evaluation signal at the input port 13. The second input signal from the second input port 14 is permanently predefined. Here, the value "zero" is defined as the second input signal.

As stated above, in the event of a fault the data bus isolating switch 5 of the control device 20 disconnects the control device 20 from the communication with the first and second data buses 4, 61. In addition, the voltage supply 8 to the control device 20 is switched off. If a control device of a pair 20, 21 or 22, 23 of control devices fails, the pair 20, 21 or 22, 23 is switched off. This is easy to understand since, for example, the second control device 21 would receive no output signal of a control device of redundant configuration via the second data bus 61 when the first control device 20 of the pair is switched off, and as a result would not be able to compare its output signal.

The control device 20 is the selected control device A which transmits the result signal to the first data bus 4 if no fault is present. If the control device 20 fails, the pair 20, 21 is switched off. Since the pair 22, 23 of control devices monitors, via the first data bus 4, whether the control device 20 transmits the output data to the data bus 4, one of the two control devices 22, 23 takes up the function of transmitting the result signal to the data bus 4.

The logic circuit of the data bus isolating switch 5 is embodied using hardware. The switchable connection between the ports 15, 16 and 17, 18, respectively, is embodied as a logic module switch. The switchable connection can, however, also be embodied as a relay switch.

The bidirectional connections 15-18 can be configured in such a way that, for example, the twisted pair cable of the CAN data bus is connected through or that in each case a corresponding transceiver unit, for example a CAN transceiver, is mounted at the data bus connection points 15-18.

The data buses 4, 60-62 are configured as CAN data buses. They could, however, also be embodied as optical data buses such as D2B or MOST or as TTP, LIN, FlexRay, Firewire etc.

The array of control devices according to the invention has a second data bus 60-62 for internal communication between the control devices 1-3, 20-23 which are of redundant configuration for a control function. This is selected in such a way that the bandwidth of the first CAN data bus 4, which ensures the communication with the further control devices in the vehicle, is generally already being used to its full capacity and no additional data traffic, such as is required for the internal communication between the control devices 1-3, 20-23 which are of redundant configuration, is possible any more.

If the selected data bus system permits a correspondingly large bandwidth so that the additional communication between the control devices 1-3, 20-23 which are of redundant configuration is ensured at the corresponding speed, the second data bus 60-62 is no longer necessary. The communication between the control devices of the vehicle as well as the communication between the control devices 1-3, 20-23 which are of redundant configuration then takes place only via the first data bus 4.

The array of control devices is ideal with asynchronous communication of the control devices. If the control devices operate synchronously, that is to say they transmit only at one specific time, the time being standardized by means of an overall system time, this has the disadvantage that a failure of the synchronization mechanism affects all the control devices of the redundant array, and the entire redundant array thus fails.

The control devices 1-3, 20-23 which are of redundant configuration can originate from different manufacturers or be constructed using different hardware.

The voting means 9 of the redundant control devices 1-3, 20-23 may use different voting processes in order to receive the evaluation signal.

The invention claimed is:
1. An redundant configuration array comprising:
  a plurality of control devices interconnected via a first data bus for controlling a plurality of components of a transportation device,
  said control devices having redundant configuration with respect to a control function being provided, and a plurality of data bus isolating switches each assigned to one of said control devices which are of redundant configuration, each of said data bus isolating switches having an output port which is connected to a voltage supply of the assigned control device via signal line, connecting or disconnecting the assigned control device with the first data bus as a function of at least one evaluation signal, and is connected to a signal line of at least one further control device, wherein each of said at least one further control device transmits an evaluation signal to the data bus isolating switch which is assigned to another one of said at least one further control device, the evaluation signal being the result of functional checking of the at least one control device with respect to the another one control device, and the data bus isolating switch of the first redundant control device disconnects the first data bus as a function of the result of a logic circuit, at least one input signal of the logic circuit being formed by the at least one evaluation signal.

2. The configuration as claimed in claim 1, wherein the control devices which are of redundant configuration with respect to a control function are connected via a second data bus in order to exchange the result signals of the control function.

3. The configuration as claimed in claim 2, wherein the control devices which are of redundant configuration with respect to a control function have a gateway function, whereby when one of said first and second data bus is disconnected, the exchange of data is maintained via another one of said first and second data bus by means of the gateway functionality.

4. The configuration as claimed in claim 3, wherein the data bus isolating switch has at least one input port for the evaluation signal of at least one further control device, and the data bus is switchably controlled by a logic circuit and by at least one evaluation signal forming an input signal of the logic circuit in order to control the communication of the assigned control device to the first data bus as a function of the result of the logic circuit.

5. The configuration as claimed in claim 2, wherein a result signal of the control function is transmitted to the first data bus via a predefinable control device from the control devices which are of redundant configuration with respect to a control function.

6. The configuration as claimed in claim 2, wherein the data bus isolating switch has at least one input port for the evaluation signal of at least one further control device, and the data bus is switchably controlled by a logic circuit and by at least one evaluation signal forming an input signal of the logic circuit in order to control the communication of the assigned control device to the first data bus as a function of the result of the logic circuit.

7. The configuration as claimed in claim 1, wherein a result signal of the control function is transmitted to the first data bus via a predefinable control device from the control devices which are of redundant configuration with respect to a control function.

8. The configuration as claimed in claim 7, wherein said predefinable control device is defined via a parameter in the control devices which are of redundant configuration with respect to a control function.

9. The configuration as claimed in claim 8, wherein the parameter maps the sequence of the replacement for said one control predefinable device from the control devices which form a replacement for control devices which are of redundant configuration with respect to a control function.

10. The configuration as claimed in claim 9, wherein the control devices which are of redundant configuration with respect to a control function have a gateway function, whereby when one of said first and second data bus is disconnected, the exchange of data is maintained via another one of said first and second data bus by means of the gateway functionality.

11. The configuration as claimed in claim 9, wherein the data bus isolating switch has at least one input port for the evaluation signal of at least one further control device, and the data bus is switchably controlled by a logic circuit and by at least one evaluation signal forming an input signal of the logic circuit in order to control the communication of the assigned control device to the first data bus as a function of the result of the logic circuit.

12. The configuration as claimed in claim 8, wherein the control devices which are of redundant configuration with respect to a control function have a gateway function, whereby when one of said first and second data bus is disconnected, the exchange of data is maintained via another one of said first and second data bus by means of the gateway functionality.

13. The configuration as claimed in claim 8, wherein the data bus isolating switch has at least one input port for the evaluation signal of at least one further control device, and the data bus is switchably controlled by a logic circuit and by at least one evaluation signal forming an input signal of the logic circuit in order to control the communication of the assigned control device to the first data bus as a function of the result of the logic circuit.

14. The configuration as claimed in claim 7, wherein the control devices which are of redundant configuration with respect to a control function have a gateway function, whereby when one of said first and second data bus is disconnected, the exchange of data is maintained via another one of said first and second data bus by means of the gateway functionality.

15. The configuration as claimed in claim 7, wherein the data bus isolating switch has at least one input port for the evaluation signal of at least one further control device, and the data bus is switchably controlled by a logic circuit and by at least one evaluation signal forming an input signal of the logic circuit in order to control the communication of the assigned control device to the first data bus as a function of the result of the logic circuit.

16. The configuration as claimed in claim 1, wherein the data bus isolating switch has at least one input port for the evaluation signal of at least one further control device, and the data bus is switchably controlled by a logic circuit and by at least one evaluation signal forming an input signal of the logic circuit in order to control the communication of the assigned control device to the first data bus as a function of the result of the logic circuit.

17. The configuration as claimed in claim 16, wherein a control signal is transmitted via the signal line as a function of the result of the logic circuit and disconnects the assigned control device from the voltage supply.

18. The configuration as claimed in claim 16, wherein the switchable connection is embodied as one of a relay switch and a logic module.

19. A data bus isolating switch comprising:

a switchable electrical connection for a data bus, wherein the data bus is connected to a data bus connection of the data bus isolating switch by a transceiver unit of a control device which is assigned to the transceiver unit;

at least one input port for the evaluation signal of at least one further control device; and an output port which is connected to the voltage supply of the assigned control device via a signal line, wherein the connection can be switched via a logic circuit, with at least one evaluation signal forming an input signal of the logic circuit in order to disconnect the communication of the control device with the data bus and to transmit, via the signal line, a control signal which disconnects the control device from the voltage supply, as a function of the result of the logic circuit.

20. The data bus isolating switch as claimed in claim 19, wherein the switchable connection is one of a relay switch and a logic module.

21. A redundant configuration array comprising:

a first control device, including a first data bus isolating switch connecting the first control device to a first data bus and having an output port connected to a voltage supply of the first control device;

a second control device, including a second data bus isolating switch connecting the second control device to the first data bus and having an output port connected to a voltage supply of the second control device;

a third control device, including a third data bus isolating switch connecting the third control device to the first data bus and having an output port connected to a voltage supply of the third control device, wherein each of the first, second and third control devices have a same control function, each of the first, second and third control devices transmit, via the first data bus, an evaluation signal to one of the first, second or third data bus isolating switches of a different one of the first, second and third control devices, and one of the first, second or third data bus isolating switches disconnecting the first, second or third control device as a function of the evaluation signal.

* * * * *